(12) United States Patent
Eoff

(10) Patent No.: US 8,470,746 B2
(45) Date of Patent: Jun. 25, 2013

(54) METHODS RELATING TO THE STABILIZATION OF HYDROPHOBICALLY MODIFIED HYDROPHILIC POLYMER TREATMENT FLUIDS UNDER ALKALINE CONDITIONS

(75) Inventor: Larry S. Eoff, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 241 days.

(21) Appl. No.: 12/956,569

(22) Filed: Nov. 30, 2010

(65) Prior Publication Data

US 2012/0135895 A1 May 31, 2012

(51) Int. Cl.
*C09K 8/584* (2006.01)
*C09K 8/588* (2006.01)

(52) U.S. Cl.
USPC .......... 507/219; 507/222; 507/240; 507/255; 507/259; 507/260; 507/262; 507/263

(58) Field of Classification Search
None
See application file for complete search history.

(56) References Cited

U.S. PATENT DOCUMENTS

| | | | |
|---|---|---|---|
| 4,152,274 A * | 5/1979 | Phillips et al. ............... 507/222 |
| 4,532,052 A | 7/1985 | Weaver et al. |
| 5,566,760 A | 10/1996 | Harris |
| 6,070,664 A | 6/2000 | Dalrymple et al. |
| 6,476,169 B1 * | 11/2002 | Eoff et al. ............... 526/307.2 |
| 6,605,570 B2 | 8/2003 | Miller et al. |
| 7,091,159 B2 | 8/2006 | Eoff et al. |
| 7,114,568 B2 | 10/2006 | Eoff et al. |
| 7,159,656 B2 | 1/2007 | Eoff et al. |
| 7,182,136 B2 | 2/2007 | Dalrymple et al. |
| 7,207,387 B2 | 4/2007 | Eoff et al. |
| 7,216,707 B2 | 5/2007 | Eoff et al. |
| 7,220,708 B2 | 5/2007 | Zamora et al. |
| 7,273,099 B2 | 9/2007 | East, Jr. et al. |
| 7,398,825 B2 | 7/2008 | Nguyen et al. |
| 7,552,771 B2 | 6/2009 | Eoff et al. |
| 7,563,750 B2 | 7/2009 | Eoff et al. |
| 7,589,048 B2 * | 9/2009 | Eoff et al. ............... 507/212 |
| 7,595,283 B2 * | 9/2009 | Eoff et al. ............... 507/212 |
| 7,741,251 B2 | 6/2010 | Eoff et al. |
| 7,759,292 B2 * | 7/2010 | Eoff et al. ............... 507/212 |
| 8,008,235 B2 * | 8/2011 | Eoff et al. ............... 507/214 |
| 8,091,638 B2 * | 1/2012 | Dusterhoft et al. ............... 166/279 |
| 8,278,250 B2 * | 10/2012 | Dalrymple et al. ............... 507/219 |
| 2002/0169085 A1 | 11/2002 | Miller et al. |
| 2004/0121916 A1 * | 6/2004 | Kono et al. ............... 507/100 |
| 2004/0229756 A1 * | 11/2004 | Eoff et al. ............... 507/219 |
| 2005/0155796 A1 | 7/2005 | Eoff et al. |
| 2005/0164894 A1 | 7/2005 | Eoff et al. |
| 2005/0194140 A1 | 9/2005 | Dalrymple et al. |
| 2005/0199396 A1 | 9/2005 | Sierra et al. |
| 2006/0124309 A1 | 6/2006 | Nguyen et al. |
| 2006/0137875 A1 | 6/2006 | Dusterhoft et al. |
| 2006/0185848 A1 | 8/2006 | Surjaatmadja et al. |
| 2006/0266522 A1 | 11/2006 | Eoff et al. |
| 2006/0283592 A1 | 12/2006 | Sierra et al. |
| 2008/0110624 A1 | 5/2008 | Nguyen et al. |
| 2008/0110812 A1 | 5/2008 | Jensen et al. |
| 2009/0095535 A1 | 4/2009 | Nguyen |
| 2009/0120642 A1 | 5/2009 | Eoff et al. |
| 2009/0271501 A1 | 10/2009 | Shenfield et al. |
| 2009/0291863 A1 | 11/2009 | Welton et al. |
| 2010/0021552 A1 | 1/2010 | Hayes et al. |
| 2010/0216672 A1 | 8/2010 | Todd |
| 2010/0307749 A1 | 12/2010 | Nguyen et al. |
| 2011/0098377 A1 | 4/2011 | Huang et al. |

FOREIGN PATENT DOCUMENTS

WO WO2008096165 A1 8/2008
WO WO 2009125164 A1 10/2009

OTHER PUBLICATIONS

International Search Report and Written Opinion for PCT/GB2012/000315 dated Jun. 27, 2012.
International Search Report and Written Opinion for PCT/GB2012/000316 dated Jun. 27, 2012.

\* cited by examiner

*Primary Examiner* — John J Figueroa
(74) *Attorney, Agent, or Firm* — Robert A. Kent; McDermott Will & Emery LLP

(57) ABSTRACT

The present invention relates to methods and compositions for treating a water- and hydrocarbon-producing subterranean formation with a relative permeability modifier, and more specifically, to improved treatment fluids, methods for preparing treatment fluids, and methods for use thereof in a subterranean formation. Methods of the present invention comprise providing a treatment fluid comprising a relative permeability modifier, at least one surfactant, and an aqueous phase base fluid; and placing the treatment fluid in a subterranean formation. The relative permeability modifier comprises a hydrophobically modified hydrophilic polymer. The at least one surfactant is operable to maintain the relative permeability modifier in a dissolved state in the treatment fluid above a pH of about 8.

20 Claims, No Drawings

METHODS RELATING TO THE STABILIZATION OF HYDROPHOBICALLY MODIFIED HYDROPHILIC POLYMER TREATMENT FLUIDS UNDER ALKALINE CONDITIONS

BACKGROUND

The present invention relates to methods and compositions for treating a water- and hydrocarbon-producing subterranean formation with a relative permeability modifier, and, more specifically, to improved treatment fluids, methods for preparing treatment fluids, and methods for use thereof to reduce the water permeability of the subterranean formation without substantially reducing the hydrocarbon permeability.

The production of water from hydrocarbon-producing wells constitutes a significant technical problem and expense in oilfield operations. When a subterranean formation contains a significant amount of water, the water's higher mobility often allows it to flow to a hydrocarbon-producing zone of the formation by way of natural and manmade fractures and high permeability streaks. If the ratio of recovered water to recovered hydrocarbons becomes significantly large, the cost of separating the water from the hydrocarbons and disposing of it becomes a significant economic barrier to production.

In order to reduce the production of undesired water from hydrocarbon-producing subterranean formations, aqueous-soluble polymer solutions containing crosslinking agents have been utilized in the art to enter water-containing zones of the formation and block the flow of undesired water. Selective placement of these crosslinked polymers in a subterranean formation and stability therein represent significant technical challenges that have somewhat limited their use. A more recent strategy to reduce water production from a subterranean formation has been to utilize agents known as relative permeability modifiers. Such relative permeability modifiers are capable of reducing the flow of water through a subterranean formation while having a minimal effect on the flow of hydrocarbons. The use of relative permeability modifiers does not necessitate the use of zonal isolation techniques that are often employed with crosslinked polymers.

Although a number of relative permeability modifiers have been successfully employed in the field, some of them are unstable under certain conditions including, for example, high or low pH, excessive salinity and/or extreme temperatures that are commonly encountered downhole. For example, at temperatures greater than about 140° F., a commonly encountered relative permeability modifier precipitates at a pH of greater than about 8. Precipitation of the relative permeability modifier not only substantially terminates its relative permeability-modifying properties but also can damage a subterranean formation if the precipitation occurs downhole. Likewise, downhole precipitation can also occur in high pH fracturing fluids for similar reasons.

SUMMARY

The present invention relates to methods and compositions for treating a water- and hydrocarbon-producing subterranean formation with a relative permeability modifier, and, more specifically, to improved treatment fluids, methods for preparing treatment fluids, and methods for use thereof to reduce the water permeability of the subterranean formation without substantially reducing the hydrocarbon permeability.

In one embodiment, the present invention provides a method comprising: providing a treatment fluid comprising a relative permeability modifier, at least one surfactant, and an aqueous phase base fluid; wherein the relative permeability modifier comprises a hydrophobically modified hydrophilic polymer; and wherein the at least one surfactant is operable to maintain the relative permeability modifier in a dissolved state in the treatment fluid above a pH of about 8; and placing the treatment fluid in a subterranean formation.

In one embodiment, the present invention provides a method comprising: providing a treatment fluid comprising a relative permeability modifier, at least one anionic surfactant, and an aqueous phase base fluid; wherein the relative permeability modifier comprises a hydrophobically modified hydrophilic polymer comprising at least one hydrophobically modified hydrophilic monomer comprising a cetyldimethylammoniumethyl methacrylate halide; wherein the at least one anionic surfactant is operable to maintain the relative permeability modifier in a dissolved state in the treatment fluid above a pH of about 8 and above a temperature of about 140° F.; and wherein the at least one anionic surfactant comprises at least one surfactant selected from the group consisting of a poly(ethylene oxide) carboxylate and a poly(ethylene oxide) sulfonate; and placing the treatment fluid in a subterranean formation.

In one embodiment, the present invention provides a composition comprising: a relative permeability modifier comprising a hydrophobically modified hydrophilic polymer comprising at least one hydrophobically modified hydrophilic monomer comprising a cetyldimethylammoniumethyl methacrylate halide; and at least one anionic surfactant; wherein the at least one anionic surfactant is operable to maintain the relative permeability modifier in a dissolved state in an aqueous phase base fluid above a pH of about 8 and above a temperature of about 140° F.; and wherein the at least one anionic surfactant comprises at least one surfactant selected from the group consisting of a poly(ethylene oxide) carboxylate and a poly(ethylene oxide) sulfonate.

The features and advantages of the present invention will be readily apparent to those of ordinary skill in the art upon a reading of the description of the embodiments that follow.

DETAILED DESCRIPTION

The present invention relates to methods and compositions for treating a water- and hydrocarbon-producing subterranean formation with a relative permeability modifier, and, more specifically, to improved treatment fluids, methods for preparing treatment fluids, and methods for use thereof to reduce the water permeability of the subterranean formation without substantially reducing the hydrocarbon permeability.

There are many advantages of the present invention, only a few of which are discussed or alluded to herein. The present invention provides compositions comprising a relative permeability modifier that have improved stability under a variety of conditions including, for example, elevated temperature and pH, and methods related thereto. Due to their increased stability, the present compositions are advantageous over those presently known in the art, since they can be used under a wider array of downhole conditions. Such improved relative permeability modifiers display substantial utility for more facile production of hydrocarbons from subterranean formations. In addition, the present compositions and methods can be extended for use in high pH fracturing fluids to combat downhole precipitation that can occur during fracturing operations. Additional advantages will become evident to those of ordinary skill in the art upon reading this disclosure.

The present invention provides methods and compositions that eliminate or substantially minimize unwanted precipitation that can occur under certain conditions with cetyl-modified poly(dimethylaminoethyl methacrylate) (poly C-DMEAMA) and other relative permeability modifiers in a treatment fluid. The methods of the present invention involve adding at least one surfactant to treatment fluids containing a relative permeability modifier in an aqueous phase base fluid. It is believed that the surfactant advantageously maintains the relative permeability modifier in a substantially dissolved state at pH values greater than about 8 at temperatures up to 200° F. and greater in some embodiments. As defined herein, a relative permeability modifier is in a substantially dissolved state when a treatment fluid containing the relative permeability modifier remains clear, hazy, or slightly hazy upon visual inspection following exposure to conditions (e.g., pH and temperature) that cause precipitation of the relative permeability modifier in the absence of a surfactant. In some embodiments, a preferred condition indicating that the relative permeability modifier remains in a dissolved state is that the treatment fluid remains clear following exposure to pH conditions that cause precipitation of the relative permeability modifier in the absence of a surfactant. Although less preferred, in other embodiments, the relative permeability modifier can still remain in a substantially dissolved state if the treatment fluid is only hazy or slightly hazy (i.e., turbid) following exposure to conditions that cause precipitation of the relative permeability modifier in the absence of a surfactant. A hazy or slightly hazy treatment fluid can indicate that the treatment fluid is on the verge of precipitation, which may not be desirable in some applications. In some embodiments described herein, inclusion of at least one surfactant in the treatment fluid, as disclosed herein, can "improve" a hazy or slightly hazy result into a clear result.

As defined herein, a "treatment fluid" is a fluid that is placed in a subterranean formation in order to improve production from the subterranean formation. Treatment fluids can include, without limitation, fracturing fluids, acidizing fluids, and damage control fluids. Such treatment fluids can have an aqueous phase or hydrocarbon phase base fluid. An aqueous phase base fluid can include fresh water, salt water, seawater, brine, or an aqueous salt solution. In some embodiments, compositions of the present invention are included in treatment fluids. In some embodiments, compositions of the present invention further comprise an aqueous phase base fluid in which the relative permeability modifier and at least one surfactant are mixed. In some embodiments, the relative permeability modifier and at least one surfactant are dissolved in the aqueous phase base fluid. In some embodiments, the aqueous phase base fluid is an aqueous salt solution. Such aqueous salt solutions can have a salt concentration ranging between about 0.1% and about 10% by weight. In some embodiments, the salt concentration is between about 1% and about 10% by weight or between about 2% and about 5% by weight in other embodiments.

In some embodiments, compositions comprising a relative permeability modifier and at least one surfactant are described herein. The relative permeability modifier comprises a hydrophobically modified hydrophilic polymer comprising at least one cetyldimethylammoniumethyl methacrylate halide hydrophobically modified hydrophilic monomer. Poly C-DMEAMA is commonly used at well bore temperatures up to about 325° C. Hence, the present invention significantly extends the working temperature range of poly C-DMEAMA and like relative permeability modifiers under alkaline conditions. Further, the present invention also advantageously circumvents the need to adjust the pH of the treatment fluid upon incorporation of the relative permeability modifier therein, which is an appreciable advantage.

In the present compositions, the relative permeability modifier has improved solubility due to the presence of at least one surfactant as disclosed herein. Typically, the relative permeability modifier is present at a concentration ranging between about 0.02% and about 3% by weight. In some embodiments, the relative permeability modifier is present at a concentration ranging between about 0.05% and about 1% by weight or, in other embodiments, from about 0.2% to about 1% by weight. Typically, the surfactant is present at a concentration ranging between about 0.1% and about 5% by weight. In some embodiments, the surfactant is present at a concentration ranging between about 0.1% and about 2% by weight or, in some embodiments, between about 0.5% and about 1% by weight.

In some embodiments, at least one anionic surfactant is operable to maintain the relative permeability modifier in a dissolved state in an aqueous phase base fluid above a pH of about 8 and above a temperature of about 140° F. In some embodiments, the at least one anionic surfactant comprises at least one surfactant selected from a poly(ethylene oxide) carboxylate and a poly(ethylene oxide) sulfonate.

In some embodiments, surfactants that are suitable for use in the present invention include anionic surfactants. Illustrative anionic surfactants that can be used in the present invention include, for example, poly(ethylene oxide) sulfonates and poly(ethylene oxide) carboxylates. In some embodiments, such anionic surfactants have a structural formula of $R^1-(O-CH_2-CH_2)_n-O-CH_2-X$ in which X is $CO_2^-$ or $SO_3^-$, n is an integer ranging from about 2 to about 20, and $R^1$ is an alkyl, alkenyl, alkynyl, aryl, aralkyl, cycloalkyl, cycloalkylalkyl, heterocyclyl, heterocyclylalkyl, heteroaryl, or heteroaralkyl group containing about 4 to about 22 carbon atoms. It will be understood that any of the aforementioned groups not expressly containing heteroatom functionality (e.g., containing O, N, S, F, Cl, Br or I moieties) can further include at least one heteroatom functionality either as part of the main carbon chain or as a side chain functionality. Further, the aforementioned groups can be in either linear or branched chain forms. It will be further understood that reference herein to poly(ethylene oxide) sulfonates or poly(ethylene oxide) carboxylates will equivalently refer to their protonated carboxylic acid or sulfonic acid forms, that is poly(ethylene oxide) sulfonic acids or poly(ethylene oxide) carboxylic acids.

In other various embodiments, suitable anionic surfactants can include, for example, poly(propylene oxide) sulfonates or poly(propylene oxide) carboxylates having a structural formula of $R^1-(O-CH_2-CH_2-CH_2)_n-O-CH_2-X$, where the variables are defined as above. In still other various embodiments, suitable anionic surfactants can include, for example, poly(ethylene oxide) sulfates having a structural formula of $R^1-(O-CH_2-CH_2)_n-O-SO_3^-$ or poly(propylene oxide) sulfates having a structural formula of $R^1-(O-CH_2-CH_2-CH_2)_n-O-SO_3^-$, where the variables are defined as above.

In their deprotonated forms, charge balance is maintained in the poly(ethylene oxide) sulfonates and poly(ethylene oxide) carboxylates and other anionic surfactants by a cation. In various embodiments, the cation can include, without limitation, monovalent cations (e.g., alkali metal cations and ammonium cations), divalent cations (e.g., alkaline earth cations) and trivalent cations. Illustrative monovalent cations include, for example, lithium, sodium, potassium, rubidium, ammonium, alkylammonium, dialkylammonium, trialkylammonium, and tetraalkylammonium (e.g., tetramethylammonium, tetraethylammonium, tetrapropylammonium, and tetrabutylammonium) cations. Illustrative divalent cations include, for example, beryllium, magnesium, calcium, strontium and barium cations. In some embodiments, the cation can be a transition metal or lanthanide metal cation. One of ordinary skill in the art will recognize that the cation selection for a given surfactant can modify the solubility of the surfactant itself or the solubility it conveys to a given hydrophobically modified hydrophilic polymer in an aqueous phase base fluid. Selection of the cation for a given operation is a matter of routine optimization and lies within the capabilities of one of ordinary skill in the art. When the identity of the cation is not expressly set forth herein, it will be understood that the cation's identity can vary without limitation.

In some embodiments, the at least one anionic surfactant is a poly(ethylene oxide) carboxylate having a structural formula of

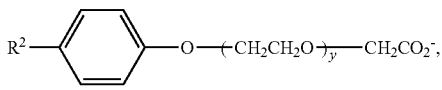

where $R^2$ is an alkyl, alkenyl, alkynyl or cycloalkyl group and y is an integer ranging from about 2 to about 20. In some embodiments, the at least one anionic surfactant is a poly(ethylene oxide) carboxylate having a structural formula of

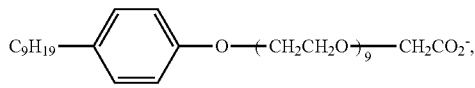

where $C_9H_{19}$ is a straight chain alkyl group. Such an anionic surfactant is commercially available under the trade name "EMCOL CNP 110" from Akzo Nobel Corporation.

In some embodiments, the at least one anionic surfactant is a poly(ethylene oxide) carboxylate having a structural formula of $R^3-(O-CH_2-CH_2)_n-O-CH_2-CO_2^-$, where $R^3$ comprises an alkyl, aryl or alkenyl group comprising about 4 to about 22 carbon atoms and n is an integer ranging from about 3 to about 15. In some embodiments, $R^3$ is an oleyl group and n is 10. In other embodiments, $R^3$ is a lauryl group and n is 13. A number of structurally related poly(ethylene oxide) carboxylate surfactants are commercially available from Clariant Corporation under the trade name "EMULSOGEN."

In some embodiments, the compositions can further comprise at least one additional surfactant that is not an anionic surfactant. Such additional surfactants can comprise at least one cationic surfactant in some embodiments, at least one amphoteric surfactant in some embodiments or at least one nonionic surfactant in some embodiments. In some embodiments, the at least one additional surfactant is an amphoteric surfactant. Inclusion of the additional amphoteric surfactant can further improve the solubility conveyed by the at least one anionic surfactant. A suitable amphoteric surfactant to be added with at least one anionic surfactant is, for example, "HC-2," an amphoteric surfactant that is commercially available from Halliburton Energy Services. Other examples of amphoteric surfactants are known to those of ordinary skill in the art and include, for example, betaines (e.g., cocoamidopropyl betaine, palmitamidopropyl betaine and lauryl betaine), glycinates and imidazolines. One of ordinary skill in the art will recognize that a suitable additional amphoteric surfactant can be selected through routine experimental optimization.

In alternative embodiments, amphoteric (zwitterionic) surfactants can be used in addition to or instead of at least one anionic surfactant. Suitable amphoteric surfactants include, for example, fatty acids having quaternized amine groups, betaines, glycinates and imidazolines.

In various embodiments, methods of the present invention comprise providing a treatment fluid comprising a relative permeability modifier, at least one surfactant, and an aqueous phase base fluid; and placing the treatment fluid in a subterranean formation. The relative permeability modifier comprises a hydrophobically modified hydrophilic polymer. In some embodiments, the at least one surfactant is an anionic surfactant. In some embodiments, the at least one surfactant is operable to maintain the relative permeability modifier in a dissolved state in the treatment fluid above a pH of about 8. In some embodiments, the at least one anionic surfactant is further operable to maintain the relative permeability modifier in a dissolved state in the treatment fluid at a temperature above about 140° F.

In various embodiments, hydrophobically modified hydrophilic polymers of the present invention comprise at least one hydrophobically modified hydrophilic monomer and, optionally, at least one hydrophilic monomer. As such, the present hydrophobically modified hydrophilic polymers can be considered as homopolymers, copolymers, terpolymers or higher order polymer structures. Positioning of the hydrophilic monomer units and the hydrophobically modified hydrophilic monomer units in copolymer and higher order polymer structures can vary without limitation and can be, for example, alternating, random, block or a combination thereof. Examples of suitable hydrophilic monomers include, for example, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, dimethylaminopropyl methacrylate, dimethylaminopropyl methacrylamide, trimethylammoniumethyl methacrylate halide (halide=chloride, bromide, iodide or a halide equivalent such as, for example, a tosylate or methanesulfonate), methacrylamide, and hydroxyethyl acrylate.

In some embodiments, the hydrophobically modified hydrophilic polymer is prepared by polymerizing at least one hydrophobically modified hydrophilic monomer or a mixture of at least one hydrophobically modified hydrophilic monomer and at least one hydrophilic monomer. In some embodiments, the hydrophobically modified hydrophilic polymer is prepared by functionalizing an existing hydrophilic polymer with a hydrophobic agent to form a hydrophobically modified hydrophilic polymer containing at least one hydrophobically modified hydrophilic monomer and, optionally, at least one hydrophilic monomer. Illustrative hydrophobically modified hydrophilic monomers include, for example, alkyl acrylates, alkyl methacrylates, alkyl acrylamides, alkyl methacrylamides, alkyldimethylammoniumethyl methacrylate bromide, alkyldimethylammoniumethyl methacrylate chloride, alkyldimethylammoniumethyl methacrylate iodide, alkyldimethylammoniumpropyl methacrylate bromide, alkyldimethylammoniumpropyl methacrylate chloride, alkyldimethylammoniumpropyl methacrylate iodide, alkyl dimethylammoniumethyl methacrylamide bromide, dimethylammoniumethyl methacrylamide chloride, dimethylammoniumethyl methacrylamide iodide, dimethylammoniumpropyl methacrylamide bromide, dimethylammoniumpropyl methacrylamide chloride and dimethylammoniumpropyl methacrylamide iodide. In general, alkyl groups of the hydrophobically modified hydrophilic monomers contain about 4 to about 22 carbon atoms.

In some embodiments, the hydrophobically modified hydrophilic polymer comprises at least one alkyldimethylammoniumethyl methacrylate halide hydrophobically modified hydrophilic monomer. In such embodiments, the alkyl group comprises about 4 to about 22 carbon atoms. In such embodiments, the halide can be chloride, bromide, iodide, or halide equivalent (e.g., toluenesulfonate or methanesulfonate), for example. In more specific embodiments, the alkyl group is a cetyl group containing 16 carbon atoms. That is, the hydrophobically modified hydrophilic polymer comprises at least one cetyldimethylammoniumethyl methacrylate halide monomer unit. As used herein, a hydrophobically modified hydrophilic polymer containing at least one cetyldimethylammonium methacrylate halide monomer unit will be referred to as cetyl-modified poly(dimethylaminoethyl methacrylate) (poly C-DMEAMA). Poly C-DMEAMA can be prepared by functionalization of an existing poly(dimethylaminoethyl methacrylate) polymer or by co-polymerization of a mixture of cetyldimethylammoniumethyl methacrylate halide and dimethylaminoethyl methacrylate (for example, see U.S. Pat. No. 7,114,568, which is incorporated by reference herein in its entirety).

In some embodiments, the at least one surfactant comprises at least one anionic surfactant such as, for example, a poly(ethylene oxide) sulfonate or a poly(ethylene oxide) carboxylate. Other suitable anionic surfactants can include, without limitation, a poly(propylene oxide) sulfonate, a poly(propylene oxide) carboxylate, a poly(ethylene oxide) sulfate, or a poly(propylene oxide) sulfate.

In some embodiments, the at least one anionic surfactant comprises a poly(ethylene oxide) carboxylate having a structural formula of

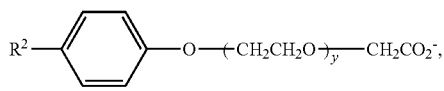

where the variables are defined as above. In some embodiments, the at least one anionic surfactant comprises a poly(ethylene oxide) carboxylate having a structural formula of

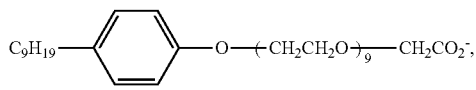

where $C_9H_{19}$ is a straight chain alkyl group.

In some embodiments, the at least one anionic surfactant comprises a poly(ethylene oxide) carboxylate having a structural formula of $R^3$—(O—$CH_2$—$CH_2$)$_n$—O—$CH_2$—$CO_2^-$, where $R^3$ comprises an alkyl, aryl or alkenyl group comprising about 4 to about 22 carbon atoms and n is an integer ranging from about 3 to about 15. In some embodiments, $R^3$ is an oleyl group and n is 10. Such an anionic surfactant is commercially available from Clariant Corporation under the trade name "EMULSOGEN COL 100." In other embodiments, $R^3$ is a lauryl group and n is 13. Such an anionic surfactant is commercially available from Clariant Corporation under the trade name "EMULSOGEN LS 24N."

In some embodiments of the present methods, the treatment fluid further comprises at least one additional surfactant that is not an anionic surfactant. The at least one additional surfactant comprises at least one cationic surfactant in some embodiments, at least one nonionic surfactant in other embodiments, and at least one amphoteric surfactant in still other embodiments. In some embodiments, the at least one additional surfactant is an amphoteric surfactant. In some embodiments, the at least one additional surfactant is "HC-2."

In some embodiments, the present methods further comprise mixing the relative permeability modifier and the at least one anionic surfactant with the aqueous phase base fluid. In some embodiments, the at least one anionic surfactant is mixed with the relative permeability modifier before being mixed with the aqueous phase base solution. In various embodiments, the present methods can be conducted by mixing a mixture of the relative permeability modifier and the at least one anionic surfactant with an aqueous phase base fluid of a treatment fluid. In alternative embodiments, the relative permeability modifier can be mixed with an aqueous phase base fluid of a treatment fluid, with the at least one anionic surfactant being added thereafter.

In some embodiments, the present methods comprise providing a treatment fluid comprising a relative permeability modifier, at least one anionic surfactant, and an aqueous phase base fluid; and placing the treatment fluid in a subterranean formation. The relative permeability modifier comprises a hydrophobically modified hydrophilic polymer comprising at least one cetyldimethylammoniumethyl methacrylate halide hydrophobically modified hydrophilic monomer. The at least one anionic surfactant is operable to maintain the relative permeability modifier in a dissolved state in the treatment fluid above a pH of about 8 and above a temperature of about 140° F. The at least one anionic surfactant comprises at least one surfactant selected from a poly(ethylene oxide) carboxylate or a poly(ethylene oxide) sulfonate.

In various embodiments, the present compositions and methods reduce the permeability of a subterranean formation to aqueous based fluids without substantially changing the permeability of the subterranean formation to hydrocarbons. After placement downhole in a subterranean formation containing water-producing zones and hydrocarbon-producing zones, the relative permeability modifier alters the permeability of the water-producing zones without substantially affecting the production of hydrocarbons from the hydrocarbon-producing zones. Without being bound by theory or mechanism, Applicants believe that during normal "leak-off" of the aqueous phase base fluid, the relative permeability modifier is adsorbed into the subterranean formation, thereby leading to a significant reduction in water permeability. It will be appreciated by those of ordinary skill in the art that the present compositions and methods are advantageous, at a minimum, because they allow zonal isolation between the water-producing zones and the hydrocarbon-producing zones of a formation at the time of completion, thereby eliminating or postponing the need for water shutoff during the production phase of the well. Further, the present compositions and methods can advantageously extend the life of a well.

Treatment fluids of the present invention can be used in both newly drilled subterranean formations and in formations needing re-stimulation. Further, the present treatment fluids can optionally comprise any number of additional components including, for example, other relative permeability modifiers, clays, scale inhibitors, corrosion inhibitors, gelling agents, crosslinking agents, foaming agents, proppants, salts, acids, fluid loss control additives, gas, catalysts, clay control agents, dispersants, flocculants, scavengers (e.g., $H_2S$ scavengers, $CO_2$ scavengers or $O_2$ scavengers), lubricants, breakers, friction reducers, antifoam agents, bridging agents, viscosifiers, weighting agents, and the like.

To facilitate a better understanding of the present invention, the following examples are given. In no way should the following examples be read to limit, or to define, the scope of the invention.

EXAMPLES

Example 1

Surfactant Stabilization of Cetyl-Modified Poly(dimethylaminoethyl Methacrylate)

The ability of a particular surfactant to stabilize a poly C-DMEAMA solution was evaluated based upon the surfactant's ability to maintain a clear or hazy solution under conditions at which poly C-DMEAMA ordinarily precipitates. Test results are summarized in Table 1 below. For the testing, poly C-DMEAMA was dissolved at a concentration of 2000 ppm in a 2% wt./vol. potassium chloride solution. Thereafter, a surfactant, surfactant combination or non-surfactant additive was added to the poly C-DMEAMA solution at the concentrations (gal/Mgal) indicated in Table 1. After mixing, the combined solution was placed in a 190° F. bath. Under these conditions, the poly C-DMEAMA solution without added surfactant produced a pH of ~8.5, and a precipitate formed upon heating. A "precipitate" result in the solution was taken to indicate a negative or neutral role for a given surfactant or like additive, whereas a "hazy", "slightly hazy" or "clear" result in the solution was taken to indicate a positive role for the given surfactant by maintaining the poly C-DMEAMA in solution, with a "clear" solution being an especially positive result.

TABLE 1

| Polymer | Surfactant Added | Surfactant Concentration (gal/Mgal) | pH | Results |
|---|---|---|---|---|
| poly DMAEMA | — | — | 8.5 | Precipitate |
| poly DMAEMA | — | — | 9.0 | Precipitate |
| poly C-DMEAMA | — | — | 9.2 | Precipitate |
| poly C-DMEAMA | — | — | 9.4 | Precipitate |
| poly C-DMEAMA | — | — | 9.6 | Hazy |
| poly C-DMEAMA | — | — | 9.8 | Hazy |
| poly C-DMEAMA | — | — | 10.0 | Hazy |
| | Anionic Surfactants | | | |
| poly C-DMEAMA | EMCOLCNP110[a] | 0.5 | 8.9 | Hazy |
| poly C-DMEAMA | EMCOLCNP110 | 0.5 | 9.5 | Hazy |
| poly C-DMEAMA | EMCOLCNP110 | 0.5 | 9.7 | Hazy |
| poly C-DMEAMA | EMCOLCNP110 | 1 | 10.0 | Clear |
| poly C-DMEAMA | EMCOLCNP110 | 1 | 11.0 | Sl. Haze |
| poly C-DMEAMA | EMCOLCNP110 | 2 | 10.0 | Clear |
| poly C-DMEAMA | EMCOLCNP110 | 2 | 11.0 | Sl. Haze |
| poly C-DMEAMA | EMCOLCNP110/HC-2[b] | 1/1 | 9.0 | Clear |
| poly C-DMEAMA | EMCOLCNP110/HC-2 | 1/1 | 9.2 | Clear |
| poly C-DMEAMA | EMCOLCNP110/HC-2 | 1/1 | 9.4 | Clear |
| poly C-DMEAMA | EMCOLCNP110/HC-2 | 0.5/0.5 | 8.7 | Hazy |
| poly C-DMEAMA | EMCOLCNP110/HC-2 | 0.5/0.5 | 9.0 | Hazy |
| poly C-DMEAMA | EMCOLCNP110/HC-2 | 0.5/0.5 | 9.2 | Hazy |
| poly C-DMEAMA | STEPWET DOS70[c] | 2 | — | Surfactant soln. hazy in 2% KCl |
| poly C-DMEAMA | AQF-2[d] | 2 | 9.0 | Precipitate |
| poly C-DMEAMA | EMULSOGEN DTC ACID[e] | 2 | 8.4 | Hazy |
| poly C-DMEAMA | EMULSOGEN COL 050A[f] | 1 | 6.8 | Hazy |
| poly C-DMEAMA | EMULSOGEN COL 050A | 1 | 9.2 | Hazy |
| poly C-DMEAMA | EMULSOGEN COL 050A | 1 | 9.4 | Hazy |
| poly C-DMEAMA | EMULSOGEN COL 050A | 1 | 9.5 | Hazy |
| poly C-DMEAMA | EMULSOGEN COL 050A | 2 | 8.9 | Hazy |
| poly C-DMEAMA | EMULSOGEN COL 050A | 2 | 9.1 | Hazy |
| poly C-DMEAMA | EMULSOGEN COL 050A | 2 | 9.4 | Hazy |
| poly C-DMEAMA | EMULSOGEN LS 24N[g] | 0.5 | 8.9 | Hazy |
| poly C-DMEAMA | EMULSOGEN LS 24N | 0.5 | 9.1 | Hazy |
| poly C-DMEAMA | EMULSOGEN LS 24N | 0.5 | 9.3 | Hazy |
| poly C-DMEAMA | EMULSOGEN LS 24N | 1 | 8.7 | Clear |
| poly C-DMEAMA | EMULSOGEN LS 24N | 1 | 9.0 | Hazy |
| poly C-DMEAMA | EMULSOGEN LS 24N | 1 | 9.3 | Hazy |
| poly C-DMEAMA | EMULSOGEN LS 24N | 2 | 8.8 | Clear |
| poly C-DMEAMA | EMULSOGEN LS 24N | 2 | 9.0 | Clear |
| poly C-DMEAMA | EMULSOGEN LS 24N | 2 | 9.2 | Clear |
| poly C-DMEAMA | EMULSOGEN LS 24N | 2 | 9.6 | Sl. Haze |
| poly C-DMEAMA | EMULSOGEN COL 100[h] | 2 | 9.0 | Clear |
| poly C-DMEAMA | EMULSOGEN COL 100 | 2 | 9.2 | Clear |
| poly C-DMEAMA | EMULSOGEN COL 100 | 1 | 8.8 | Clear |
| poly C-DMEAMA | EMULSOGEN COL 100 | 1 | 9.0 | Clear |
| poly C-DMEAMA | EMULSOGEN COL 100 | 1 | 9.3 | Clear |
| poly C-DMEAMA | EMULSOGEN COL 100 | 0.5 | 8.9 | Clear |
| poly C-DMEAMA | EMULSOGEN COL 100 | 0.5 | 9.1 | Clear |
| poly C-DMEAMA | EMULSOGEN COL 100 | 0.5 | 9.3 | Clear |
| poly C-DMEAMA | EMULSOGEN COL 100 | 0.5 | 10.0 | Clear |
| poly C-DMEAMA | EMULSOGEN COL 100 | 0.5 | 11.0 | Sl. Haze |
| poly C-DMEAMA | EMULSOGEN COL 100 | 0.45 | 8.7 | Clear |

TABLE 1-continued

| Polymer | Surfactant Added | Surfactant Concentration (gal/Mgal) | pH | Results |
|---|---|---|---|---|
| poly C-DMEAMA | EMULSOGEN COL 100 | 0.45 | 9.4 | V. Sl. Haze |
| poly C-DMEAMA | EMULSOGEN COL 100 | 0.45 | 10.0 | Hazy |
| poly C-DMEAMA | EMULSOGEN COL 100 | 0.45 | 11.0 | Hazy |
| poly C-DMEAMA | EMULSOGEN COL 100 | 0.4 | 4.6 | Clear |
| poly C-DMEAMA | EMULSOGEN COL 100 | 0.4 | 5.3 | Clear |
| poly C-DMEAMA | EMULSOGEN COL 100 | 0.4 | 8.8 | Clear |
| poly C-DMEAMA | EMULSOGEN COL 100 | 0.4 | 9.0 | Clear |
| poly C-DMEAMA | EMULSOGEN COL 100 | 0.4 | 9.2 | Clear |
| poly C-DMEAMA | EMULSOGEN COL 100 | 0.4 | 9.4 | Sl. Haze |
| poly C-DMEAMA | EMULSOGEN COL 100 | 0.4 | 9.6 | V. Sl. Haze |
| poly C-DMEAMA | EMULSOGEN COL 100 | 0.4 | 9.8 | V. Sl. Haze |
| poly C-DMEAMA | EMULSOGEN COL 100 | 0.4 | 10.3 | V. Sl. Haze |
| poly C-DMEAMA | EMULSOGEN COL 100 | 0.3 | 8.8 | Clear |
| poly C-DMEAMA | EMULSOGEN COL 100 | 0.3 | 9.0 | Hazy |
| poly C-DMEAMA | EMULSOGEN COL 100 | 0.3 | 9.3 | Hazy |
| poly C-DMEAMA | EMULSOGEN COL 100/ EMULSOGEN COL 050A | 0.2/0.2 | 8.8 | Clear |
| poly C-DMEAMA | EMULSOGEN COL 100/ EMULSOGEN COL 050A | 0.2/0.2 | 9.1 | Clear |
| poly C-DMEAMA | EMULSOGEN COL 100/ EMULSOGEN COL 050A | 0.2/0.2 | 9.4 | Clear |
| poly C-DMEAMA | EMULSOGEN COL 100/ EMULSOGEN COL 050A | 0.2/0.2 | 9.7 | Clear |
| poly C-DMEAMA | EMULSOGEN COL 100/ EMULSOGEN COL 050A | 0.2/0.2 | 10.0 | Clear |
| poly C-DMEAMA | EMULSOGEN COL 100/ EMULSOGEN COL 050A | 0.2/0.2 | 10.6 | Clear |
| poly C-DMEAMA | STABILIZER 434C[i] | 1 | 9.0 | Precipitate |
| poly C-DMEAMA | STABILIZER 434C | 1.5 | 8.8 | Precipitate |
| poly C-DMEAMA | STABILIZER 434C | 2 | 8.9 | Clear |
| poly C-DMEAMA | STABILIZER 434C | 2 | 9.0 | Clear |
| poly C-DMEAMA | STABILIZER 434C | 2 | 9.5 | Clear |
| poly C-DMEAMA | STABILIZER 434C | 4 | 11.2 | Sl. Hazy |
| poly C-DMEAMA | STABILIZER 434D[j] | 2 | 9.0 | Precipitate |
| poly C-DMEAMA | DDBSA[k] | 50# | 9.2 | Precipitate |
| poly C-DMEAMA | STRATALOCK F[l] | 0.5 | 9.0 | Hazy |
| poly C-DMEAMA | STRATALOCK F | 1 | 10.2 | Clear |
| poly C-DMEAMA | STRATALOCK F | 1 | 11.0 | Hazy |
| poly C-DMEAMA | STRATALOCK F | 1 | 12.0 | Hazy |
| poly C-DMEAMA | STRATALOCK F | 2 | 10.2 | Clear |
| poly C-DMEAMA | STRATALOCK F | 2 | 10.1 | Hazy |
| poly C-DMEAMA | STRATALOCK F | 4 | 9.0 | Clear |
| poly C-DMEAMA | STRATALOCK F | 4 | 10.2 | Clear |
| poly C-DMEAMA | STRATALOCK F | 4 | 11.0 | V. Sl. Hazy |
| poly C-DMEAMA | SEM-7[m] | 2 | 9.0 | Precipitate |
| poly C-DMEAMA | POLYSTEP B430S[n] | 2 | 9.0 | Precipitate |
| Cationic Surfactants | | | | |
| poly C-DMEAMA | DMCB-80[o] | 4 | 9.0 | Hazy |
| poly C-DMEAMA | AROMOX DMC[p] | 4 | 10.1 | Hazy |
| Nonionic Surfactants | | | | |
| poly C-DMEAMA | DUAL SPACER B[q] | 4 | 9.0 | Hazy |
| poly C-DMEAMA | DUAL SPACER B | 2 | 8.8 | Precipitate |
| poly C-DMEAMA | DUAL SPACER B | 2 | 9.2 | Precipitate |
| poly C-DMEAMA | MUSOL A[r] | 2 | 9.0 | Precipitate |
| poly C-DMEAMA | GASPERM 1000[s] | 2 | 9.0 | Precipitate |
| poly C-DMEAMA | PEN 88M[t] | 2 | 9.0 | V. Hazy |
| poly C-DMEAMA | ETHOMEEN C/25[u] | 2 | 8.9 | Hazy |
| poly C-DMEAMA | ETHOMEEN C/25 | 2 | 9.1 | Hazy |
| poly C-DMEAMA | ETHOMEEN C/25 | 2 | 9.3 | Hazy |
| poly C-DMEAMA | TWEEN 40[v] | 2 | 8.8 | Hazy |
| Amphoteric Surfactants | | | | |
| poly C-DMEAMA | AMPHOSOL CG[w] | 1 | 8.5 | Hazy |
| poly C-DMEAMA | AMPHOSOL CG | 1.5 | 9.2 | Precipitate |
| poly C-DMEAMA | AMPHOSOL CG | 1.5 | 9.4 | Precipitate |
| poly C-DMEAMA | AMPHOSOL CG | 1.5 | 9.6 | Precipitate |
| poly C-DMEAMA | AMPHOSOL CG | 2 | 8.5 | Clear |
| poly C-DMEAMA | AMPHOSOL CG | 4 | 10.1 | Clear |
| poly C-DMEAMA | AMPHOSOL CG | 4 | 11.2 | Hazy/Precipitate |
| poly C-DMEAMA | MIRATAINE CAB-A[x] | 2 | 10.2 | Hazy |
| poly C-DMEAMA | MIRATAINE CAB-A | 4 | 10.1 | Clear |
| poly C-DMEAMA | MIRATAINE CAB-A | 4 | 11.1 | Hazy |

TABLE 1-continued

| Polymer | Surfactant Added | Surfactant Concentration (gal/Mgal) | pH | Results |
|---|---|---|---|---|
| poly C-DMEAMA | MIRATAINE BET0-30[y] | 4 | — | Surfactant was insol. in 2% KCl |
| poly C-DMEAMA | HC-2 | 1 | 8.8 | Precipitate |
| poly C-DMEAMA | HC-2 | 1 | 9.5 | Hazy |
| poly C-DMEAMA | HC-2 | 1.5 | 8.5 | Clear |
| poly C-DMEAMA | HC-2 | 1.5 | 9.0 | Hazy |
| poly C-DMEAMA | HC-2 | 1.5 | 9.5 | Precipitate |
| poly C-DMEAMA | HC-2 | 1.5 | 10.0 | Hazy |
| poly C-DMEAMA | HC-2 | 1.5 | 11.0 | Hazy |
| poly C-DMEAMA | HC-2 | 2 | 10.0 | Hazy |
| poly C-DMEAMA | HC-2 | 4 | 10.0 | Hazy |
| poly C-DMEAMA | HC-2 | 2 | 11.4 | Hazy |
| poly C-DMEAMA | HC-2 | 3 | 11.4 | Hazy |
| poly C-DMEAMA | HC-2 | 4 | 11.4 | Sl. Hazy |
| poly C-DMEAMA | HC-2 | 5 | 11.4 | Sl. Hazy |
| poly C-DMEAMA | HC-2 | 10 | 11.4 | Sl. Hazy |
| poly C-DMEAMA | SCHERCOTAINE PAB[z] | 2 | 9.0 | Clear |
| poly C-DMEAMA | SCHERCOTAINE PAB | 2 | 10.0 | Precipitate |
| poly C-DMEAMA | CHROMABOND S-100[aa] | 2 | 8.9 | Hazy |
| poly C-DMEAMA | CHROMABOND S-100 | 2 | 9.3 | Hazy |
| poly C-DMEAMA | CHROMABOND S-403E[bb] | 2 | 8.7 | Hazy |
| poly C-DMEAMA | CHROMABOND S-403E | 2 | 9.2 | Hazy |
| | Non-Surfactant Additives | | | |
| poly C-DMEAMA | 60% sodium lactate | 2 | 9.0 | V. Hazy |
| poly C-DMEAMA | Tartaric acid | 50# | 9.4 | Hazy |
| poly C-DMEAMA | Sodium Citrate | 50# | 8.8 | Precipitate |
| poly C-DMEAMA | Sodium Citrate | 50# | 9.0 | Hazy |
| poly C-DMEAMA | Sodium Citrate | 50# | 9.2 | Hazy |
| poly C-DMEAMA | Sodium Citrate | 50# | 9.4 | Hazy |
| poly C-DMEAMA | Propionic Acid | 2 | 9.0 | V. Hazy |
| poly C-DMEAMA | Benzoic Acid | 50# | 9.0 | Precipitate |
| poly C-DMEAMA | Benzoic Acid | 50# | 9.5 | Hazy |
| poly C-DMEAMA | Caprylic Acid | 5 | 9.1 | Precipitate |
| poly C-DMEAMA | Sodium Xylene Sulfonate | 2 | 9.0 | Precipitate |
| poly C-DMEAMA | Sodium Xylene Sulfonate | 10 | 9.0 | Precipitate |

V. = very, Sl. = slight

[a] EMCOL CNP 110 is an aralkyl ethoxylated carboxylate surfactant that is commercially available from Akzo Nobel Corporation.
[b] HC-2 is a cocoamine betaine surfactant that is commercially available from Halliburton Energy Services.
[c] STEPWET DOS70 is sodium dioctyl sulfosuccinate surfactant that is commercially available from Stepan Company.
[d] AQF-2 is an alcohol sulfonate surfactant that is commercially available from Halliburton Energy Services.
[e] EMULSOGEN DTC ACID is trideceth-7 carboxylate surfactant that is commercially available from Clariant Corporation.
[f] EMULSOGEN COL 050A is an alkyl ether carboxylate surfactant having a formula R—(O—$CH_2CH_2$)$_5$—O—$CH_2$—$CO_2H$ (R = $C_{12}/C_{14}$ alkyl) that is commercially available from Clariant Corporation.
[g] EMULSOGEN LS 24N is sodium laureth-13 carboxylate surfactant that is commercially available from Clariant Corporation.
[h] EMULSOGEN COL 100 is an alkyl ether carboxylate surfactant having a formula R—(O—$CH_2CH_2$)$_{10}$—O—$CH_2$—$CO_2H$ (R = oleyl) that is commercially available from Clariant Corporation.
[i] STABILIZER 434C is an oxyalkylated sulfonate surfactant that is commercially available from Halliburton Energy Services.
[j] STABILIZER 434D is an ethoxylated isododecyl alcohol sulfonate surfactant that is commercially available from Halliburton Energy Services.
[k] DDBSA is dodecylbenzene sulfonic acid.
[l] STRATALOCK F is an alkylaryl polyoxycarboxylate that is commercially available from Halliburton Energy Services.
[m] SEM-7 is an ethoxylated alcohol sulfate that is commercially available from Halliburton Energy Services.
[n] POLYSTEP B430S is an ethoxylated alcohol sulfate that is commercially available from Stepan.
[o] DMCB-80 is benzyl cocoalkyl dimethyl quaternary ammonium chloride surfactant that is commercially available from Akzo Nobel Corporation.
[p] AROMOX DMC is a mixture of coco dimethylamine N-oxide and coco dimethylamine surfactant that is commercially available from Akzo Nobel Corporation.
[q] DUAL SPACER B is nonylphenol polyethylene glycol ether surfactant that is commercially available from Halliburton Energy Services.
[r] MUSOL A is an ether alcohol that is commercially available from Halliburton Energy Services.
[s] GASPERM 1000 is a non-ionic surfactant mixture that is available from Halliburton Energy Services.
[t] PEN 88M is an ethoxylated alcohol that is commercially available from Halliburton Energy Services.
[u] ETHOMEEN C/25 is a coco alkyl ethoxylated amine surfactant that is commercially available from Akzo Nobel Corporation.
[v] TWEEN 40 is polyoxyethylene sorbitan monopalmitate surfactant that is commercially available from Sigma-Aldrich Corporation.
[w] AMPHOSO L CG is cocoamidopropyl betaine that is commercially available from Stepan.
[x] MIRATAINE CAB-A is a cocoamidopropyl betaine that is commercially available from Rhodia.
[y] MIRATAINE BET0-30 is an oleyldimethylamidopropyl betaine that is commercially available from Rhodia.
[z] SCHERCOTAINE PAB is palmitamidopropyl betaine surfactant that is commercially available from Scher Chemicals.
[aa] CHROMABOND S-100 is poly(N-carboxymethyl-4-vinylpyridinium) chloride surfactant that is commercially available from ISP Chemical Corporation.
[bb] CHROMABOND S-403E is 4-ethenyl pyridine homopolymer N-oxide surfactant that is commercially available from ISP Chemical Corporation.

Example 2

Permeability Reduction in a Sandstone Core Using Surfactant-Stabilized Cetyl-Modified Poly(dimethylaminoethyl Methacrylate)

A sandstone core was treated with a 2000 ppm poly C-DMEAMA solution at 175° F., and the reduction in core permeability was measured according to standard methods described in U.S. Pat. No. 6,476,169, which is incorporated herein by reference in its entirety. The sequence of addition for the permeability measurements was 1) water, 2) oil, 3) water, 4) poly C-DMEAMA treatment fluid, and 5) water. Surfactant-stabilized poly C-DMEAMA solutions were prepared in two ways. First, a poly C-DMEAMA treatment solution was prepared, and the surfactant was then added to the treatment fluid at the indicated concentration. Second, the surfactant was added to bulk poly C-DMEAMA, and the treatment fluid was prepared thereafter by dissolving the bulk poly C-DMEAMA at the indicated concentration. Permeability reduction results are summarized in Table 2.

TABLE 2

| Surfactant | Surfactant Concentration (gal/Mgal) | pH | % Permeability Reduction |
|---|---|---|---|
| — | — | 6.0 | 98 |
| *Addition of Surfactant to poly C-DMEAMA Solution* | | | |
| Emulsogen COL 100 | 0.5 | 8.7 | 98 |
| Emulsogen COL 100 | 0.5 | 9.5 | 98 |
| Emulsogen COL 100/ Emulsogen LS 24N | 0.15/0.45 | 8.8 | 98 |
| *Addition of Surfactant to Bulk poly C-DMEAMA* | | | |
| Emulsogen COL 100 | 0.4 | 8.7 | 98 |
| Emulsogen COL 100 | 0.4 | 10.0 | 97 |

As shown in Table 2, incorporation of a stabilizing surfactant in a poly C-DMEAMA treatment fluid did not degrade the permeability reduction. Without the added surfactant, the poly C-DMEAMA treatment fluid was less effective at pH values greater than 8 due to precipitation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. A method comprising:
   providing a treatment fluid comprising a relative permeability modifier, at least one anionic surfactant, and an aqueous phase base fluid;
      wherein the relative permeability modifier comprises a hydrophobically modified hydrophilic polymer; and
      wherein the at least one anionic surfactant is operable to maintain the relative permeability modifier in a dissolved state in the treatment fluid above a pH of about 8, the at least one anionic surfactant comprising a poly(ethylene oxide) carboxylate; and
   placing the treatment fluid in a subterranean formation.

2. The method of claim 1, wherein the at least one anionic surfactant is further operable to maintain the relative permeability modifier in a dissolved state in the treatment fluid at a temperature above about 140° F.

3. The method of claim 2, wherein the hydrophobically modified hydrophilic polymer comprises at least one hydrophobically modified hydrophilic monomer.

4. The method of claim 3, wherein the hydrophobically modified hydrophilic monomer comprises an alkyldimethylammoniumethyl methacrylate halide;
   wherein the alkyl group comprises about 4 to about 22 carbon atoms.

5. The method of claim 4, wherein the alkyl group is a cetyl group.

6. The method of claim 2, wherein the treatment fluid further comprises at least one additional surfactant that is not an anionic surfactant.

7. The method of claim 2, wherein the at least one anionic surfactant comprises a poly(ethylene oxide) carboxylate having a structural formula of

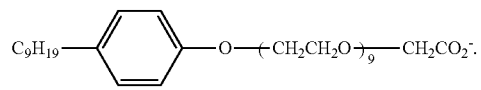

8. The method of claim 2, wherein the at least one anionic surfactant comprises a poly(ethylene oxide) carboxylate having a structural formula of $R^3-(O-CH_2-CH_2)_n-O-CH_2-CO_2^-$;
   wherein $R^3$ comprises an alkyl, aryl or alkenyl group comprising about 4 to about 22 carbon atoms and n is an integer ranging from about 3 to about 15.

9. The method of claim 8, wherein $R^3$ is an oleyl group and n is 10.

10. The method of claim 8, wherein $R^3$ is a lauryl group and n is 13.

11. The method of claim 2, further comprising:
    mixing the relative permeability modifier and the at least one anionic surfactant in the aqueous phase base fluid.

12. The method of claim 11, wherein the at least one anionic surfactant is mixed with the relative permeability modifier before being mixed in the aqueous phase base fluid.

13. A method comprising:
providing a treatment fluid comprising a relative permeability modifier, at least one anionic surfactant, and an aqueous phase base fluid;
wherein the relative permeability modifier comprises a hydrophobically modified hydrophilic polymer comprising at least one hydrophobically modified hydrophilic monomer comprising a cetyldimethylammoniumethyl methacrylate halide;
wherein the at least one anionic surfactant is operable to maintain the relative permeability modifier in a dissolved state in the treatment fluid above a pH of about 8 and above a temperature of about 140° F.; and
wherein the at least one anionic surfactant comprises at least one surfactant selected from the group consisting of a poly(ethylene oxide) carboxylate and a poly(ethylene oxide) sulfonate; and
placing the treatment fluid in a subterranean formation.

14. The method of claim 13, wherein the at least one anionic surfactant comprises a poly(ethylene oxide) carboxylate having a structural formula of $R^3$—(O—$CH_2$—$CH_2$)$_n$—O—$CH_2$—$CO_2^-$;
wherein $R^3$ comprises an alkyl, aryl or alkenyl group comprising about 4 to about 22 carbon atoms and n is an integer ranging from about 3 to about 15.

15. The method of claim 14, wherein $R^3$ is an oleyl group and n is 10.

16. The method of claim 14, wherein $R^3$ is a lauryl group and n is 13.

17. The method of claim 13, wherein the treatment fluid further comprises at least one additional surfactant that is not an anionic surfactant.

18. The method of claim 13, further comprising:
mixing the relative permeability modifier and the at least one anionic surfactant in the aqueous phase base fluid.

19. The method of claim 18, wherein the at least one anionic surfactant is mixed with the relative permeability modifier before being mixed in the aqueous phase base fluid.

20. A method comprising:
providing a treatment fluid comprising a relative permeability modifier, at least one anionic surfactant, and an aqueous phase base fluid;
wherein the relative permeability modifier comprises a hydrophobically modified hydrophilic polymer; and
wherein the at least one anionic surfactant is operable to maintain the relative permeability modifier in a dissolved state in the treatment fluid above a pH of about 8, the at least one anionic surfactant comprising a surfactant that is selected from the group consisting of

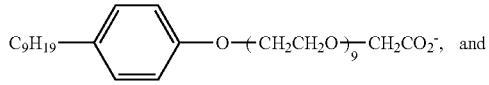

and $R^3$—(O—$CH_2$—$CH_2$)$_n$—O—$CH_2$—$CO_2^-$;
wherein $R^3$ comprises an alkyl, aryl or alkenyl group comprising about 4 to about 22 carbon atoms and n is an integer ranging from about 3 to about 15; and
placing the treatment fluid in a subterranean formation.

* * * * *